United States Patent [19]

Marino et al.

[11] Patent Number: 5,768,037
[45] Date of Patent: Jun. 16, 1998

[54] ACTUATOR WITH SINGLE SURFACE-FIELD MOTOR

[75] Inventors: Philip F. Marino; Charles J. Simpson, both of Rochester; Paul D. Heppner, Hilton, all of N.Y.

[73] Assignee: Eastman Kodak Company, Rochester, N.Y.

Related U.S. Application Data

[60] Provisional application No. 60/005,396 Oct. 6, 1995.

[21] Appl. No.: 656,655

[22] Filed: May 31, 1996

[51] Int. Cl.⁶ .................................................. G02B 7/02
[52] U.S. Cl. ........................ 359/824; 359/814; 369/44.15
[58] Field of Search ............................ 359/824, 814, 359/823; 369/44.15, 44.16, 244, 44.14, 44.21

[56] References Cited

U.S. PATENT DOCUMENTS

| 4,638,471 | 1/1987 | vanRosmalen | 369/44.14 |
|---|---|---|---|
| 4,727,529 | 2/1988 | Araki et al. | 369/44.32 |
| 4,759,005 | 7/1988 | Kasahara | 369/44.21 |
| 4,861,138 | 8/1989 | Suzuki | 359/824 |
| 4,882,723 | 11/1989 | Van Rosmalen | 359/824 |
| 4,911,534 | 3/1990 | van Henegouwen et al. | 359/824 |
| 4,913,527 | 4/1990 | Jessop | 359/823 |
| 5,126,983 | 6/1992 | Ikegame et al. | 369/13 |
| 5,136,558 | 8/1992 | Getreuer et al. | 369/44.15 |
| 5,165,088 | 11/1992 | Suzuki et al. | 369/44.14 |
| 5,184,002 | 2/1993 | Chu | 369/44.15 |
| 5,235,574 | 8/1993 | Aviles et al. | 369/32 |
| 5,506,732 | 4/1996 | Mori | 359/824 |

FOREIGN PATENT DOCUMENTS

| 0 092 997 | 11/1983 | European Pat. Off. |
| 62-22953 | 10/1987 | Japan . |

Primary Examiner—Loha Ben
Attorney, Agent, or Firm—Raymond L. Owens

[57] ABSTRACT

A lens actuator for an optical disc storage device including a base; a lens holder assembly movably mounted to said base; said lens holder assembly comprising a lens holder with a single surface-field magnet and a lens mounted thereon; a single surface-field coil set mounted to said base parallel to and proximate said surface-field magnet; whereby a current introduced in a coil of said coil set produces a net magnetic force having a resultant line of action passing through said lens holder assembly.

30 Claims, 5 Drawing Sheets

ACTUATOR WITH SINGLE SURFACE-FIELD MOTOR

CROSS REFERENCE TO RELATED APPLICATION

Reference is made to and priority claimed from U.S. Provisional Application Ser. No. 60/005,396, filed 6 Oct. 1995, entitled ACTUATOR WITH SINGLE SURFACE-FIELD MOTOR.

FIELD OF THE INVENTION

The present invention relates to an improved optical recording actuator for driving a lens holder in focus and fine tracking movements.

BACKGROUND OF THE INVENTION

Focus/tracking actuators are used in optical disc recording and reading devices to control the lens position relative to the rotating disc. Both focus (the distance between the lens and the disc surface) and tracking (the correct radial position of the lens so as to read or write a single track at a time) must be maintained. This is necessary to compensate for unavoidable warpage of the disc, spindle errors, and other mechanical and optical imperfections. The focus and tracking motions of the actuator are controlled by a servo system.

The actuator servo system typically includes one or more electromagnetic motors to generate the forces necessary to move the lens holder, and one or more position sensors to provide feedback to control the motion. Each electromagnetic motor comprises a coil or coil assembly and a permanent magnet, with one or the other being mounted to the moveable portion of the actuator. Each position sensor comprises a light source, an optical slot or flag, and a photosensitive detector.

The use of a single motor, located away from the center of gravity of the moving mass of the actuator, would normally be expected to cause dynamic problems. A single, unbalanced motor would typically excite rotational resonances of the actuator due to the moments induced. These inertial moments are caused by the distance between the line of action of the motor force and the center of gravity of the moving portion of the actuator. This is one reason that existing optical recording actuators typically use coils wrapped around the lens holder, or surface-field motors used in balanced pairs. While reducing torsional resonance, however, these motor configurations limit the optical paths available for a designer to pass a beam from the optical head to the lens. The writing/reading beam from the optical head therefore typically enters the actuator from below; that is, from the side of the actuator opposite the disc. This limits the compactness of the reader/writer system.

Motors with wrap-around coil configurations often include a section of unsupported wire coil. The flexibility of the unsupported portion of coil causes additional unwanted mechanical resonances. These resonances degrade actuator and system performance, require more complex and costly servo control systems, and limit the frequency response of the actuator, thereby limiting the system read and write speed.

Sensors providing positional information to the servo system typically utilize a light source, such as an LED, that is separate from the source of the beam used to read and write information on the disk. An image is created in this separate beam using a slot or flag mounted to the lens holder, and is projected onto a photosensitive detector. These components are often mounted on the side of the lens holder, adding to its size and mass.

It is necessary to limit the travel of the lens holder in both the focus and tracking directions in order to avoid overtravel, which may damage components. This is especially true in a power-off condition during transport. Stops are typically added to the base and the lens holder to prevent overtravel.

SUMMARY OF THE INVENTION

The actuator of the invention is driven by a single surface-field electromagnetic motor with three or four poles. The term "surface-field motor" as used herein is defined as a motor with a multiple pole magnet and a thin coil set arranged on opposite sides of a gap having the shape of a planar, curved or angled surface. Similarly, "surface-field magnet" and "surface-field coil" refer to components configured for use in a surface-field motor. In a preferred embodiment of the present invention, the multiple pole magnet of the actuator motor is attached to the lens holder, which is the moving portion of the actuator. The lens holder is supported by four flexures. The use of a single motor leaves open three sides of the lens holder, allowing the optical head to be on the same level as the actuator, with the beam entering the actuator between the four flexures. The beam is then turned by a fixed mirror or prism, or other turning means, and enters the actuator lens after this turn. It is then focused by the actuator lens onto the disk.

In another embodiment of the invention, a beam splitter is used to turn the beam, and a portion of the beam is allowed to pass through the beam splitter. An image is created in this portion of the beam by an aperture in the magnet structure. This image passes through a clearance hole in the coil assembly, and strikes a photosensitive detector mounted behind the coil structure. The outer surfaces of the beam splitter, in conjunction with molded internal surfaces of the lens holder, can be used as stops to limit travel at both extremes of each of the focus and tracking coordinates.

DETAILED DESCRIPTION OF THE PREFERRED EMBODIMENTS

Figure 1:
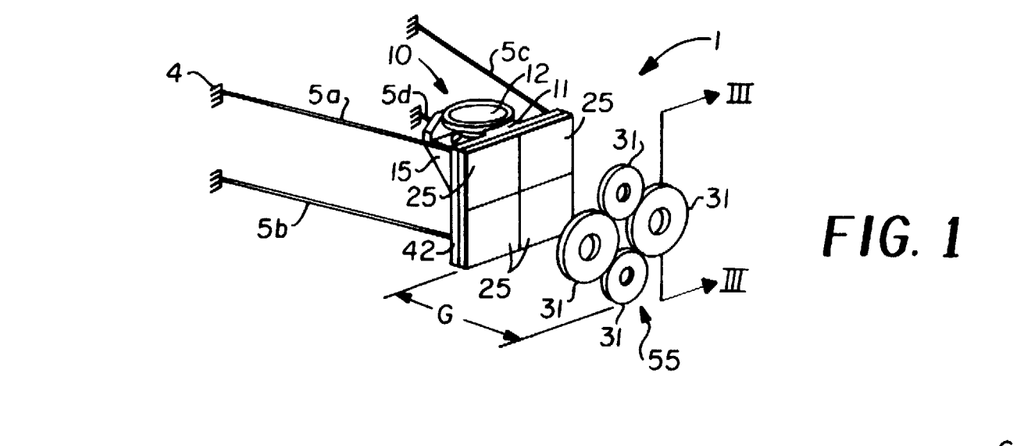
FIG. 1 is a perspective view of one embodiment of the optical actuator of the present invention.
Figure 2:
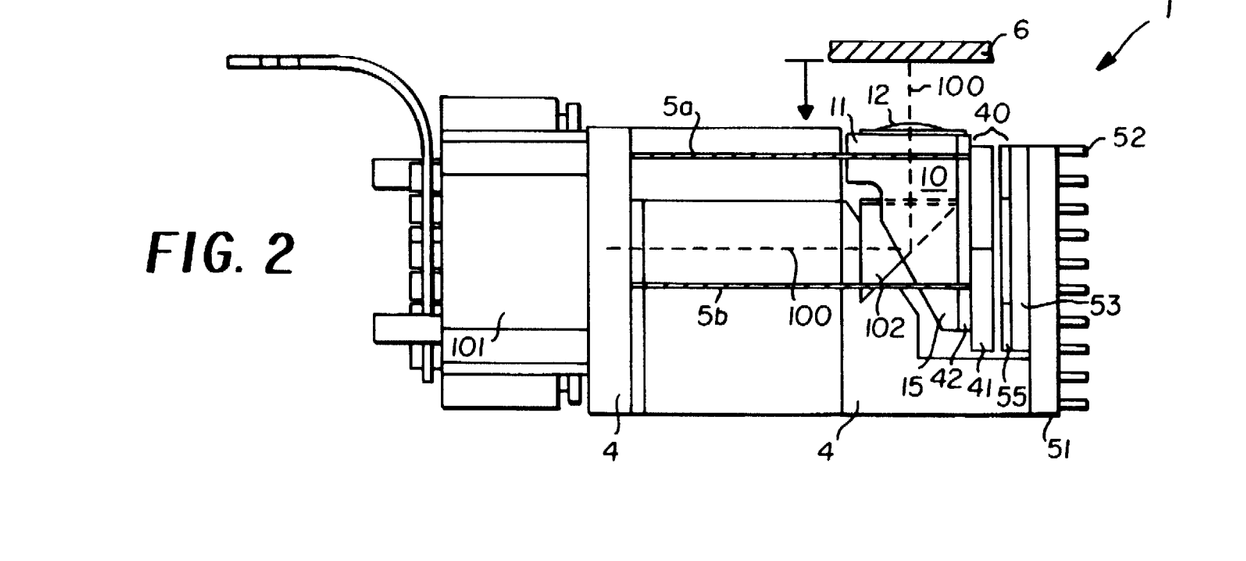
FIG. 2 is a partial cut-away side elevation view of the actuator of FIG. 1.

As shown in FIGS. 1 and 2, the actuator 1 of the present invention comprises a moving lens holder assembly 10 connected to a base 4 by flexures 5a–5d. The base 4 is shown schematically in FIG. 1 in order to simplify the view. Also attached to the base 4 is the coil set 55 consisting of round coils 31. In FIG. 1, the attachment of the coil set to the base 4 is not shown, and the gap G between the coil set and the lens holder assembly 10 has been exaggerated for clarity.

The lens holder assembly 10 comprises a lens holder 11, a lens 12 mounted in the lens holder 11 and a quadrapole magnet 41 consisting of four square magnets 41a–d with flux return plate 42. The lens holder can be injection molded from a high modulus plastics material such as Vectra® liquid crystal polymer. A vertical flange 15 extends downward from the front of the lens holder 11, adding rigidity to the lens holder 11; the remaining sides of the lens holder 11 are left open. As shown in FIG. 2, this configuration allows a read/write beam 100 to pass through the lens holder 11, through the lens 12, and onto an optical disc 6 to read or write information.

Returning to FIG. 1, the lens holder 11 is suspended by four flexures 5a–5d. The flexures act collectively as a torsional spring, allowing the lens holder 11 to move vertically for focusing and laterally for tracking. Because the flexures are not parallel, the lateral motion is not pure translation but rather a rotation about a line between the virtual intersections of the flexures. This flexure angle also results in improved actuator dynamics and increased robustness to assembly tolerances. The flexures 5a–5d shown in FIGS. 1 and 2 are constructed of a medium flexibility wire attached in cantilever supports to the base 4 and the lens holder 11. The wires bend in response to forces applied to the lens holder 11, permitting the lens holder 11 to translate in the focus and tracking directions. Alternatively, injection molded plastic flexures (not shown) could be used. Each plastic flexure has two flexible segments which allow for focus motion, and two flexible segments which allow for tracking motion.

The single, surface-field electromagnetic motor assembly 40 comprises a quadrapole magnet 41 attached to the lens holder 11, and a coil set 55 attached to the base 4. By using the motor in an inverted (moving magnet) configuration, the resultant forces on the lens holder 11 can be located at a point proximate or coincident with the center of gravity of the lens holder assembly 10, as described below. This greatly reduces or eliminates inertial moments normally expected with a single offset motor. Further, the use of surface-field moving magnets eliminates the resonance problems typically resulting from unsupported segments of wire coils. In addition, no flexible leads are required to carry current to the moving part of the actuator.

As shown in FIG. 2, the set of coils 55 is attached to a bracket 51 which is secured to the base 4. In accord with the invention, the set of coils 55 is arranged in a surface configuration which, advantageously, can be relatively thin and compact. The shape of the coils in the coil set 55 can be square, rectangular, round, oval, triangular or any other appropriate shape to enhance the performance of the electromagnetic motor, as long as a surface-field arrangement is maintained. The coil set may be constructed using conventional wound coils or, due to the flattened nature of the coil set, printed circuit coils can be used which can be fabricated by either thin film or thick film processes. As used herein, "coil set" or "set of coils" includes, and is not limited to, a surface-field construct comprising conventional wound coils or printed circuit coils.

In the configuration where the coils are attached to a piece of printed circuit board, the resulting assembly can be manufactured in an automated assembly cell to minimize cost. Such a part can be supplied by the coil manufacturer as a subassembly.

A coil flux return plate 53 (FIG. 2) can be located behind the set of coils 55 to decrease the electromagnetic motor's sensitivity to the distance from the quadrapole magnet 41 to the plane of the coil set 55 as well as increase the magnetic flux in the gap.

The set of coils 55 is attached to a substrate or integrated into a structure, preferably with an adhesive, in the configuration shown. The substrate can be the bracket 51, the coil flux return plate 53 or an intermediary material such as a printed circuit board containing circuit traces for appropriately interconnecting the coils and providing an attachment point for the servo power supply used for controlling the forces developed by the electromagnetic motor.

Figure 4:
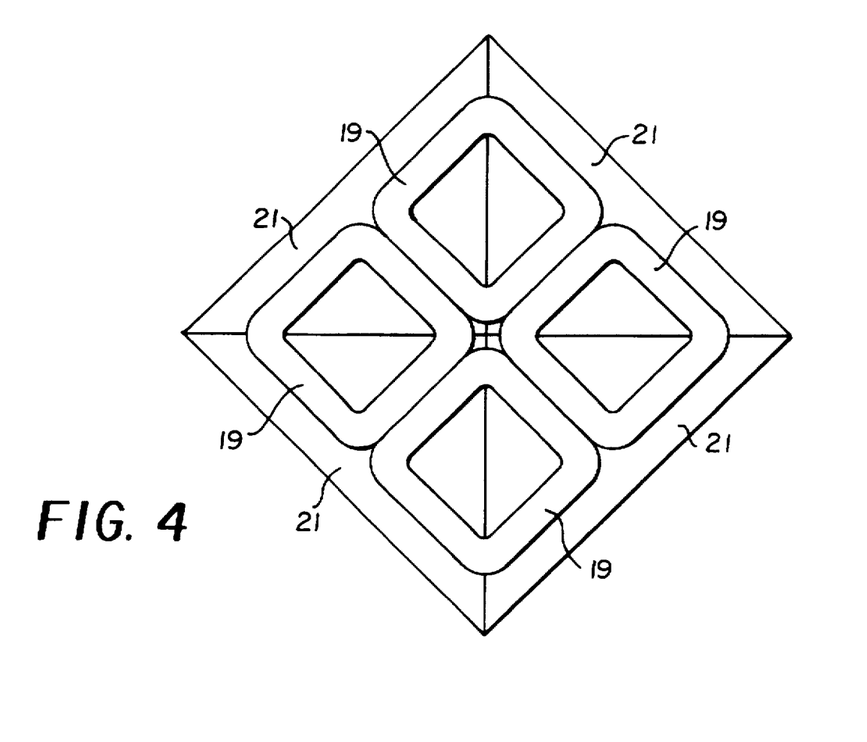
FIG. 4 illustrates a coil/magnet configuration having four square coils and four triangular magnets.
Figure 6:
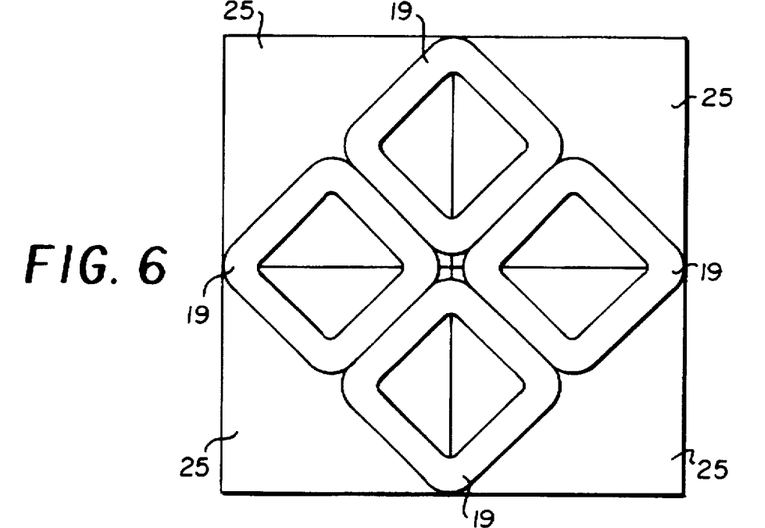
FIG. 6 illustrates a coil/magnet configuration having square coils and square magnets.

The set of coils 55 is placed facing and in close proximity to the quadrapole magnet 41. The magnet structure has a planar, curved or angled surface shape and has alternating areas of north and south poles with a minimum of three poles. FIG. 1 illustrates a motor structure having four round coils 31 facing a quadrapole magnet 41 with four square magnetic poles 25. An alternative configuration consists of four square coils with a quadrapole magnet 41 (having two north and two south poles) as shown in FIGS. 4 and 6 which illustrate alternative embodiments of such a configuration. In FIG. 4, the square coils 19 face a quadrapole magnet 41 having triangular magnetic poles 21. In FIG. 6, the square coils 19 face a quadrapole magnet having square magnetic poles 25.

As shown in FIGS. 1 and 2, the quadrapole magnet 41 is attached to the outer surface of the vertical flange 15 of the lens holder 11. The structure can be made either by assembling appropriately polarized pieces of permanent magnet or by magnetizing a single piece of magnetic material in the desired configuration using known technology. The back side of the quadrapole magnet 41 can be equipped with a flux return plate 42 consisting of a steel or other soft magnetic material that increases efficiency by increasing the magnitude of the magnetic flux and thus the force developed by the electromagnetic motor for a given current.

Figure 5:
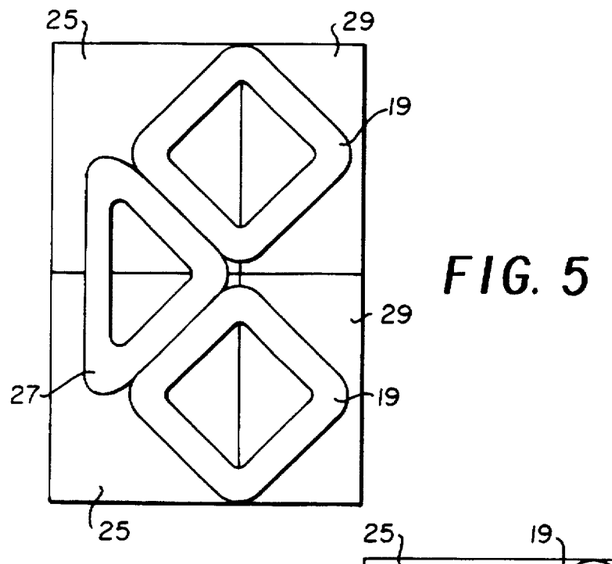
FIG. 5 illustrates a coil/magnet configuration having two square coils, one triangular coil and square and rectangular magnets.

The configuration of the quadrapole magnet 41 is not limited to the configurations illustrated. Other configurations include, for example, a round magnet, or the intersections between the magnetic poles can be arranged from corner to corner rather than from side to side by using triangular magnetic poles, as shown in FIG. 4. FIG. 5 illustrates a 15 coil set having two square coils 19 and one triangular coil 27. The coil set faces a quadrapole magnet having two square magnetic poles 25 and two rectangular magnetic poles 29.

Figure 7:
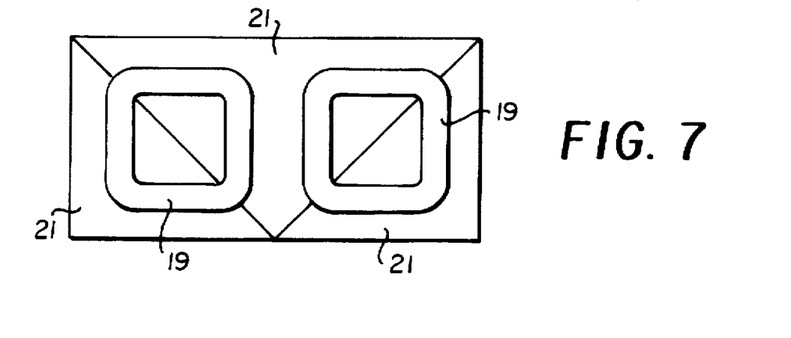
FIG. 7 illustrates a coil/magnet configuration having two square coils and three triangular magnets.

FIG. 7 illustrates two square coils 19 facing a magnet structure having three triangular magnetic poles 21. An electromagnetic motor having two coils and three magnetic poles is not capable of independent control of the torque exerted in the plane of the coil set since that would require three degrees of freedom and there are only two control variables (currents or length of wire) with two coils. Those skilled in the art will understand that other combinations of coils and magnetic poles can be used in accord with the invention in addition to those shown in FIGS. 1–7.

The intersections of the north and south pole areas are aligned along the diagonal centerlines of the coils in the case of square or rectangular coils, across a diameter in the case of 35 round coils, or from the midpoint of the base to the right angle corner in the case of right isosceles coils. The center point of the quadrapole magnet 41 preferably is aligned with the center of the set of coils 55 in the case with four coils and four magnetic poles.

The attachment of the set of coils 55 to the bracket 51, and of the quadrapole magnet 41 to the lens holder 11, can be made by any conventional means, such as glue, bonding, or screws. Other means will be apparent to those skilled in the art. A set of cooling fins 52 extend from the surface of the bracket 51 opposite the coil set 55 to conduct heat away from the coils. A suitable physical separation should be maintained between the coils and the magnets. The separation can vary depending on the arrangement chosen. The preferred separation is within the range of 0.1 mm and 0.5 mm.

As discussed in more detail below with reference to FIG. 3, when current is supplied to any one of the coils in coil set 55 a resultant force is developed by the motor on the lens holder assembly 10. The resultant force $F_r$ is directed through a point offset from the center of the coil. The force lies in a plane parallel to the plane containing the coil sets 55 and orthogonal to the plane separating the multiple pole magnetic structures 25. If the direction and magnitude of the current to the individual coils is appropriately selected, then forces can be developed in either the focus or the tracking directions. In addition, if the amount of current is different, or even reversed, between opposite coils within each coil set 55, a torque can be developed about the mid-point of the coils. The same effect can be produced by maintaining a constant current and varying the number of turns in the opposite coils.

Figure 8:
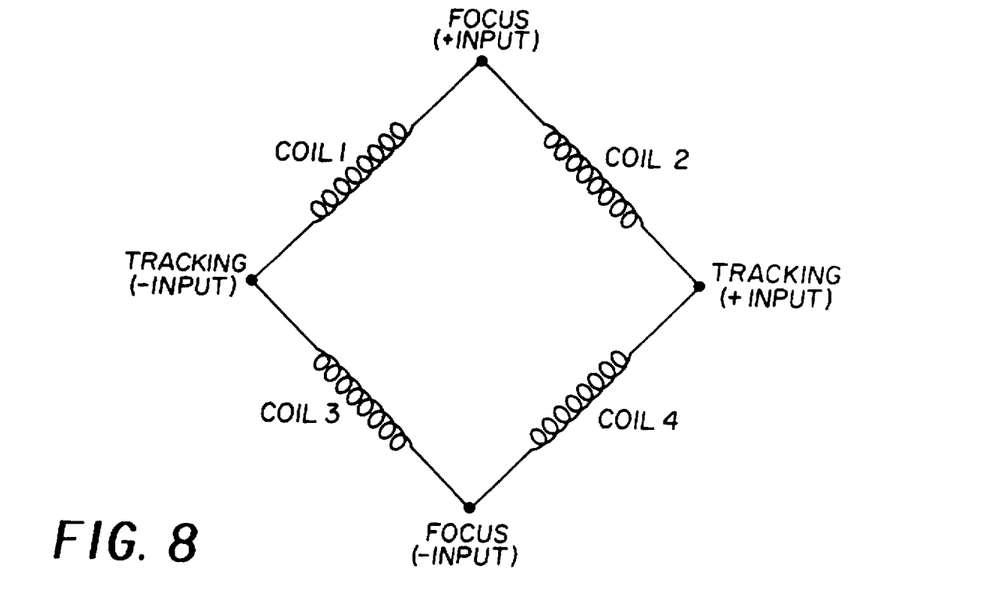
FIG. 8 illustrates a bridge circuit for an actuator having a tilted coil/magnet configuration.
Figure 9:
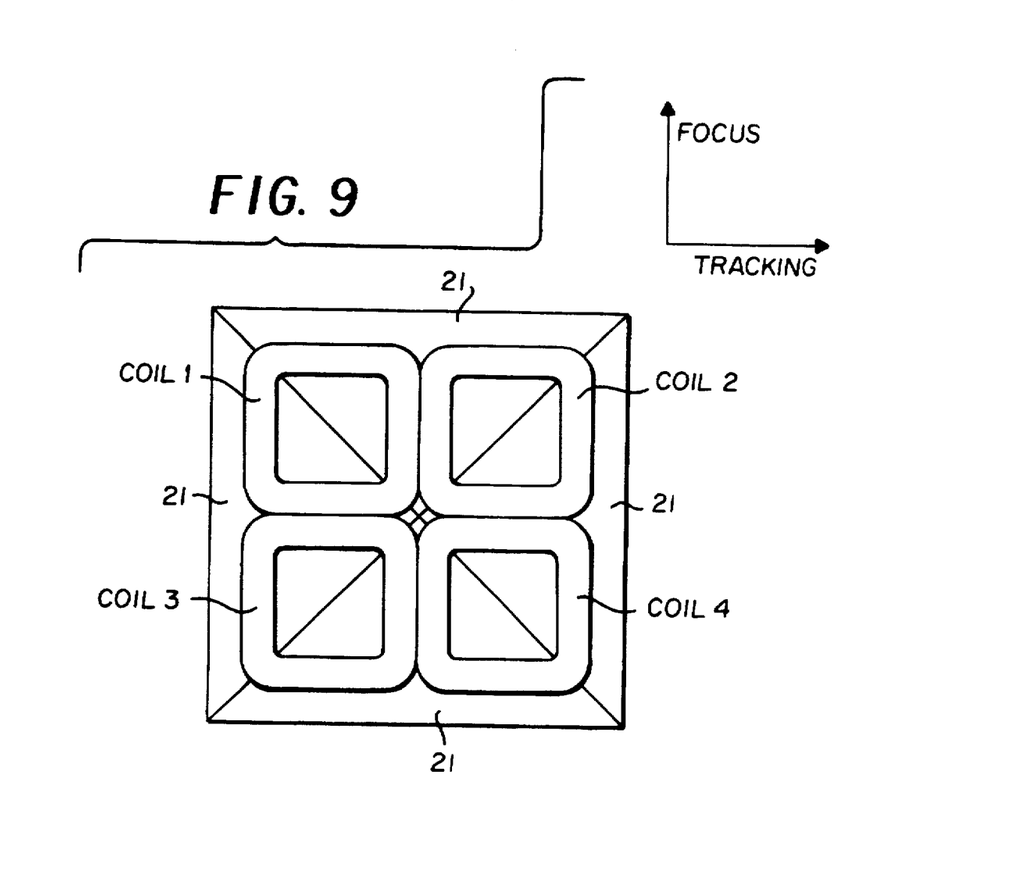
FIG. 9 illustrates a coil/magnet configuration which can be used in conjunction with the bridge circuit of FIG. 8.

The electromagnetic motor can be constructed with the coil set 55 and the magnet structures rotated 45 degrees, or any other desirable angle about the axis through the center of the coils set orthogonal to the surface of the coil set 55, to provide a lower height actuator. This arrangement lowers the height of the electromagnetic motor but increases the complexity of the servo system since the forces generated by the coil set 55 would not be singular in the focus and tracking directions. This potentially would increase the complexity of the servo system, which would now need to quantify the accelerations required in the focus and tracking directions and solve the equations of motion for the oblique forces that are developed in the coils. An alternative approach, which does not significantly increase the servo complexity, is to use a coil control bridge circuit, such as that shown in FIG. 8. The bridge circuit can be implemented with the coil/magnet arrangement illustrated in FIG. 9. The bridge circuit distributes the current supplied by the servo control system to the coils in such a way that the servo need only supply direct focus and tracking control currents.

Figure 3:
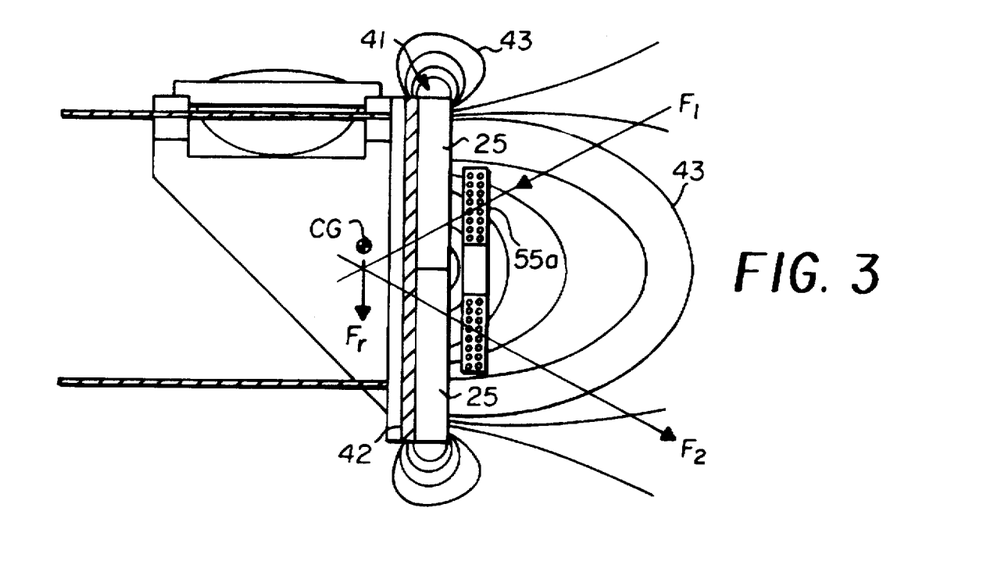
FIG. 3 is a schematic side sectional view of a lens holder assembly of the present invention, showing the orientation of magnetic flux lines and generated forces.

FIG. 3 is a partial sectional view of the actuator in plane III—III of FIG. 1. The square magnetic poles 25 of quadrapole magnet 41 produce magnetic flux 43. The round coil 31 is shown in section as it lies in the magnetic field (for clarity, only one focus coil is shown; the same principle applies to the other focus coil and the tracking coils). The forces generated on each part of the active coil segments are perpendicular to both the magnetic flux lines 43 and the coil current, which travels into and out of the plane of FIG. 3. These forces are shown by arrows $F_1$ and $F_2$. The resultant sum $F_r$ of the two forces shown acts vertically at the intersection of $F_1$ and $F_2$, along a line of action that is within or behind the actual magnet structure. The exact location of the line of action of $F_r$ is controllable by varying the magnet structure geometry, the coil size and the coil location. The location of the center of gravity of the lens holder assembly 10 can similarly be controlled by the design of the lens holder 11 and the location and size of the quadrapole magnet 41 and of the flux plate 42, if used. By manipulating these parameters, the effective line of force $F_r$ can be located at, or near, the center of gravity of the moving portion of the actuator. This results in the reduction of dynamic moments, reducing spurious resonance in the actuator frequency response.

By using a single motor assembly fewer parts are required, reducing cost and assembly time, and increasing reliability. At the same time, dynamic performance is good because there are no coils attached to the moving assembly to cause resonances, and the force is applied at or near the center of gravity of the moving portion of the actuator.

The moving magnet motor does not require current to be carried to the moving part of the actuator. Therefore there is no need for flex circuits or flexible wire leads. This reduces cost and complexity and increases reliability and life.

As best shown in FIG. 2, the use of a single motor assembly 40 at one end of the lens holder 11 allows for the laser assembly 101 to horizontally direct the read/write beam 100 into the lens holder assembly 10 between the flexures 5a and 5b. The beam is turned by a fixed mirror or prism 102, or other turning device mounted to the base 4 within the lens holder 11. These components can all be mounted at or near the same distance from the optical disk 6. Positioning the laser assembly and the turning device within the Z location occupied by the lens holder 11 allows for smaller system packaging. This compact configuration has improved structural and thermal stability and therefore higher performance and less sensitivity to thermal and mechanical stresses.

Figure 10:
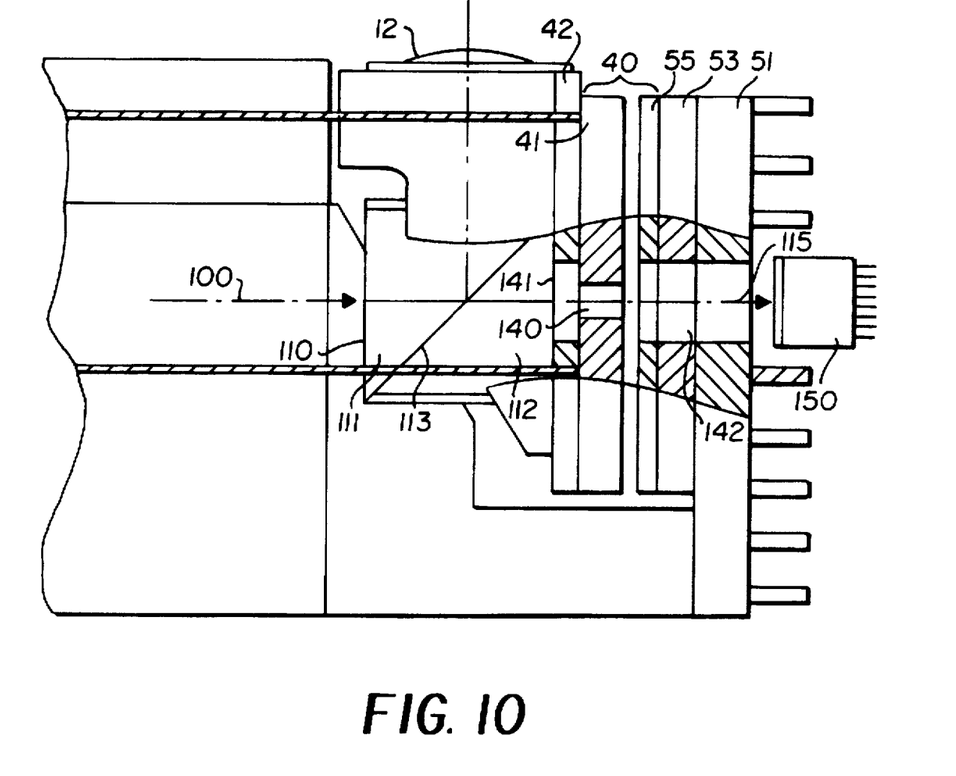
FIG. 10 illustrates a partial cut-away side elevation view of one embodiment of the actuator of the invention.

In the embodiment of the invention shown in FIG. 10, a portion of the read/write beam 100 is utilized in conjunction with an optical position sensor 150 for measuring the deflection of the lens holder assembly 10 in the focus and/or tracking directions. Information from the position sensor is used in the feedback control of the motor assembly 40.

A cubic beam splitter 110 functions as a turning device to reflect most of the read/write beam 100 (approximately 95% in a currently preferred embodiment) upward through the lens 12 for reading or writing information to the optical disk (not shown). The transmitted portion 115 of the read/write beam 100 continues in a straight path through the cubic beam splitter 110 and the motor assembly 40, and strikes an optical position sensor 150 as described below. The beam splitter comprises a triangular turning prism 111, a triangular correction prism 112, and a partially reflective surface 113 sandwiched between the prisms. This known configuration substantially eliminates the effect of the index of refraction of the turning prism on the path of the transmitted portion 115 of the read/write beam 100.

An image producing means such as masking hole 140 in the quadrapole magnet 41 creates an image in the transmitted portion 115. This image strikes the optical position sensor 150, which is rigidly mounted to the base 4 through bracket 51. A hole 141 in the flux return plate 42 provides a path for the transmitted portion 115. Clearance hole 142 in the coil flux return plate 53 and the bracket 51 provides a path for the image created by masking hole 140 in the quadrapole magnet 41, and provides clearance for motion of the image as the lens holder 11 deflects. While in the current preferred embodiment the magnet structure is attached to the moving lens holder 11, those skilled in the art will recognize that the beam splitter can also be used in an actuator with the coil assembly attached to the lens holder 11, and with the masking hole in the coil assembly.

In operation, the transmitted portion 115 of read/write beam 100 continues in an essentially straight path through the cubic beam splitter 110. Because the masking hole 140 is a part of the lens holder assembly 10, the position of the image of the hole on the optical position sensor 150 moves with the lens holder position.

The optical position sensor 150 is preferably a quad-cell detector capable of measuring the position of the image in both the tracking and focus directions, such as a multi-element silicon diode Ser. No. S4349 marketed by Hamatsu Corp. Alternatively, a device such as a position sensitive detector, Ser. No. S1743, also sold by Hamatsu Corp., could be used. If the measurement of motion in only one of the tracking and focus directions is required, a single axis detector such as Hamatsu Ser. No. F3273-4 could be used.

By utilizing a portion of the read/write beam 100 for sensing the position of the lens holder 11 with respect to the base 4, there is no need for an additional illumination source to provide a measurement beam. Further, no separate masking flags or apertures are required because the masking hole 140 is an integral part of the quadrapole magnet 41. This reduces cost and reduces the mass of the moving portion of the actuator. Because the components of the position sensing system are contained largely within the envelope of the actuator, the package remains compact.

Figure 11:
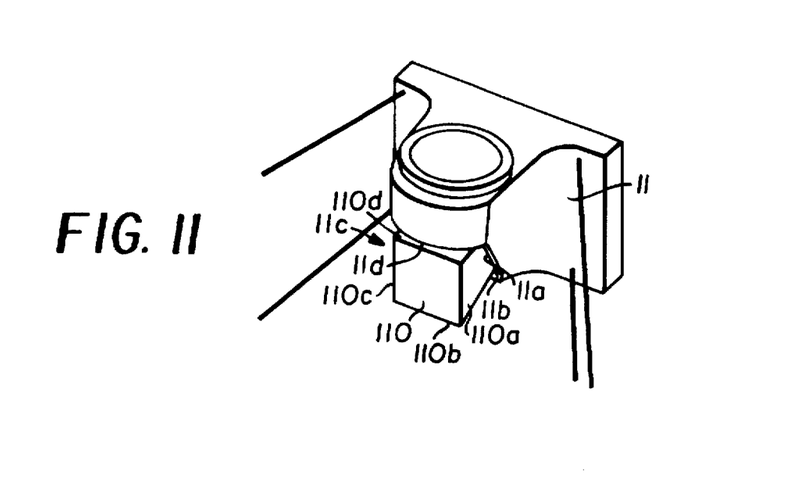
FIG. 11 illustrates a perspective view of a lens holder and beam splitter of one embodiment of the invention.

In a preferred embodiment of the invention, the cubic beam splitter 110 is used in conjunction with surfaces molded in the lens holder 11 to provide travel stops in the focus and tracking directions. As shown in FIG. 11, lens holder surfaces 11a and 11c (hidden),stop against corresponding beam splitter surfaces 110a and 110c, preventing overtravel in the tracking direction. Similarly, lens holder surfaces 11b and 11d stop against the beam splitter surfaces 110b and 110d, preventing overtravel in the focus direction. By utilizing the surfaces of the beam splitter as stops, the need for special stop surfaces fixed to the base 4 is eliminated, reducing cost.

The embodiments described herein are made without limitation. Other embodiments in addition to those illustrated and described herein will be known to those skilled in the art. Therefore, the invention is limited only by the claims.

The invention has been described in detail with particular reference to certain preferred embodiments thereof, but it will be understood that variations and modifications can be effected within the spirit and scope of the invention.

| Parts List | |
|---|---|
| 4 | base |
| 5a–5d | flexures |
| 6 | optical disc |
| 10 | lens holder assembly |
| 11 | lens holder |
| 11a–d | lens holder surfaces |
| 12 | lens |
| 15 | vertical flange |
| 19 | square coils |
| 21 | triangular magnetic poles |
| 25 | square magnetic poles |
| 27 | triangular coils |
| 29 | rectangular magnetic poles |
| 31 | round coils |
| 40 | motor assembly |

-continued

| Parts List | |
|---|---|
| 41 | quadrapole magnet |
| 41a–d | multiple pole magnet structure |
| 42 | flux return plate |
| 43 | magnetic flux lines |
| 51 | bracket |
| 52 | cooling fins |
| 53 | coil flux return plate |
| 55 | coil set |
| 100 | read/write beam |
| 101 | laser assembly |
| 102 | prism |
| 110 | cubic beam splitter |
| 110a–110d | beam splitter surfaces |
| 111 | triangular turning prism |
| 112 | triangular correction prism |
| 113 | partially reflective surface |
| 115 | transmitted portion |
| 140 | masking hole |
| 141 | hole |
| 142 | clearance hole |
| 150 | optical position sensor |

We claim:

1. A lens actuator for an optical disc storage device, comprising:
    a base;
    a lens holder assembly movably mounted to said base; said lens holder assembly comprising a lens holder with a single surface-field magnet and a lens mounted thereon;
    a single surface-field coil set mounted to said base parallel to and proximate said surface-field magnet; whereby a current introduced in a coil of said coil set produces a net magnetic force having a resultant line of action passing through said lens holder assembly.

2. The lens actuator of claim 1, wherein said magnet comprises at least three poles, and said coil set comprises at least two coils.

3. The lens actuator of claim 1, wherein said magnet comprises four triangular poles, and said coil set comprises four square coils.

4. The lens actuator of claim 1, wherein said lens holder assembly is supported by horizontal flexures attached to said base.

5. The lens actuator of claim 4, further comprising a laser assembly for providing a beam; said beam having a horizontal portion between said flexures.

6. The lens actuator of claim 5, wherein said laser assembly and said lens holder are positioned equidistant from an optical disk.

7. The lens actuator of claim 5, wherein said lens holder comprises a vertical flange depending downward from a first side of said lens holder for supporting said magnet, and said horizontal beam is projected into a second side of said lens holder opposite said flange.

8. The lens actuator of claim 5, further comprising a beam turning device for turning at least a first portion of said beam, said beam turning device mounted to said base partially within said lens holder assembly.

9. The lens actuator of claim 8, wherein said beam turning device is a beam splitter whereby a second portion of said beam is transmitted.

10. The lens actuator of claim 9, further comprising a masking aperture in said lens holder assembly for forming an image in said transmitted portion of said beam, and an optical position detector for measuring the position of said image.

11. The lens actuator of claim 10, wherein said aperture is in said magnet.

12. The lens actuator of claim 8, wherein said lens holder assembly further comprises stop surfaces for contacting said beam turning device to limit movement of said lens holder assembly.

13. The lens actuator of claim 1, wherein said lens holder assembly further comprises a flux return plate mounted between said magnet and said lens holder.

14. The lens actuator of claim 1, further comprising a flux return plate mounted beneath said coil set.

15. The lens actuator of claim 1, wherein said resultant line of action of said magnetic force passes essentially through a center of gravity of said lens holder assembly.

16. A lens position actuator for an optical disc reading and recording head, comprising:

a base;

a lens holder movably mounted to said base;

a surface-field magnetic motor mounted to a side of said lens holder and to said base;

a laser assembly mounted to said base for projecting a horizontal beam through a side of said lens holder opposite said magnetic motor.

17. The lens position actuator of claim 16, wherein said motor further comprises a surface-field magnet mounted to said lens holder, and a surface-field coil set mounted to said base.

18. The lens position actuator of claim 16, further comprising a lens mounted to said lens holder and a beam turning device mounted to said base below said lens for directing at least a first portion of said horizontal beam through said lens.

19. The lens position actuator of claim 18, wherein said laser assembly and said beam turning device are disposed equidistant from an optical disk.

20. The lens position actuator of claim 18, wherein said beam turning device is a beam splitter whereby a second portion of said beam is transmitted.

21. The lens actuator of claim 20, wherein said lens holder has a masking aperture for forming an image in said transmitted portion of said beam, and an optical position detector for measuring the position of said image.

22. The lens actuator of claim 21, wherein said motor comprises a surface-field magnet mounted to said lens holder, and wherein said aperture is in said magnet.

23. The lens actuator of claim 18, wherein said lens holder further comprises stop surfaces for contacting said beam turning device to limit movement of said lens holder.

24. An optical read/record actuator, comprising:

a base;

a lens holder movably mounted to the base;

a beam splitter fixedly mounted to the base;

a laser assembly mounted to the base for projecting a beam into said beam splitter whereby said beam splitter splits said beam into a first portion and a second portion, said first portion being directed toward an optical disk;

an image producing means mounted to said lens holder for creating an image in said second portion of said beam;

an optical position detector mounted to said base in a path of said second portion of said beam for sensing a position of said image.

25. The optical read/record actuator of claim 24, wherein said beam splitter is a cubic element comprising a triangular turning prism, a triangular correction prism and a partially reflective coating sandwiched therebetween.

26. The optical read/record actuator of claim 24, wherein said optical position detector senses a position of the image in a tracking direction and a focus direction.

27. The optical read/record actuator of claim 24, wherein said beam splitter is within said lens holder and said lens holder further comprises stop surfaces for contacting said beam splitter to limit movement of said lens holder.

28. The optical read/record actuator of claim 24, further comprising a surface-field electromagnetic motor having a magnet structure mounted to said lens holder and a coil set mounted to said base.

29. The optical read/record actuator of claim 28, wherein said image producing means comprises an aperture in said magnet structure.

30. The optical read/record actuator of claim 24, further comprising a surface-field electromagnetic motor having a coil set mounted to said lens holder and a magnet structure mounted to said base.

\* \* \* \* \*